INVENTOR
Everard F. Kohl
BY John Mahoney
ATTORNEY

Aug. 15, 1950

E. F. KOHL 2,518,478

CENTRIFUGAL FLUID GOVERNOR

Filed May 16, 1942

INVENTOR
*Everard F. Kohl*
BY *John Mahoney*
ATTORNEY

Aug. 15, 1950  E. F. KOHL  2,518,478
CENTRIFUGAL FLUID GOVERNOR
Filed May 16, 1942  6 Sheets-Sheet 3

INVENTOR
*Everard F. Kohl*
BY *John Mahoney*
ATTORNEY

Aug. 15, 1950  E. F. KOHL  2,518,478
CENTRIFUGAL FLUID GOVERNOR
Filed May 16, 1942  6 Sheets-Sheet 4

INVENTOR
*Everard F. Kohl*
BY *John Mahoney*
ATTORNEY

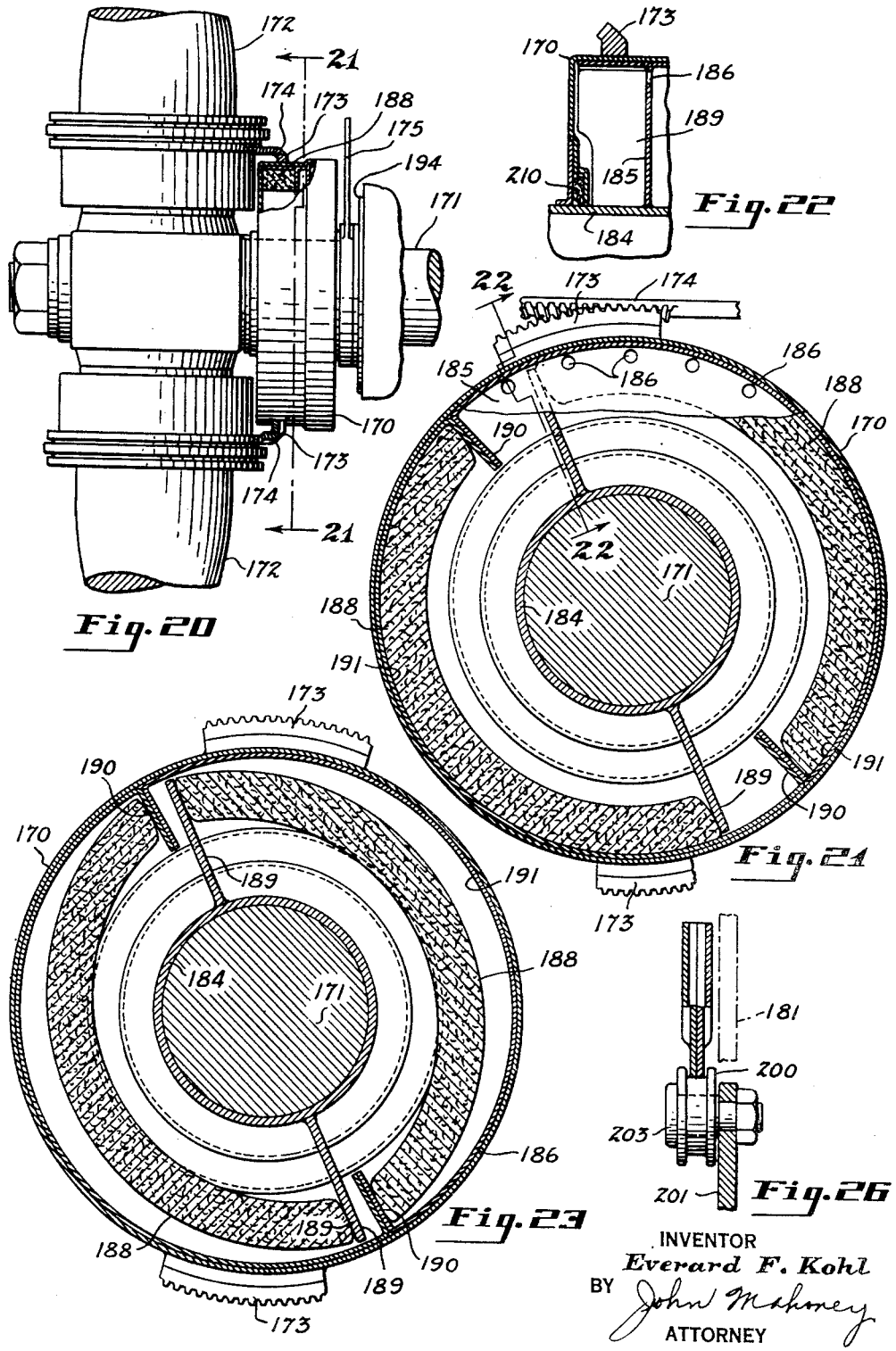

Aug. 15, 1950
E. F. KOHL
2,518,478
CENTRIFUGAL FLUID GOVERNOR
Filed May 16, 1942
6 Sheets-Sheet 6
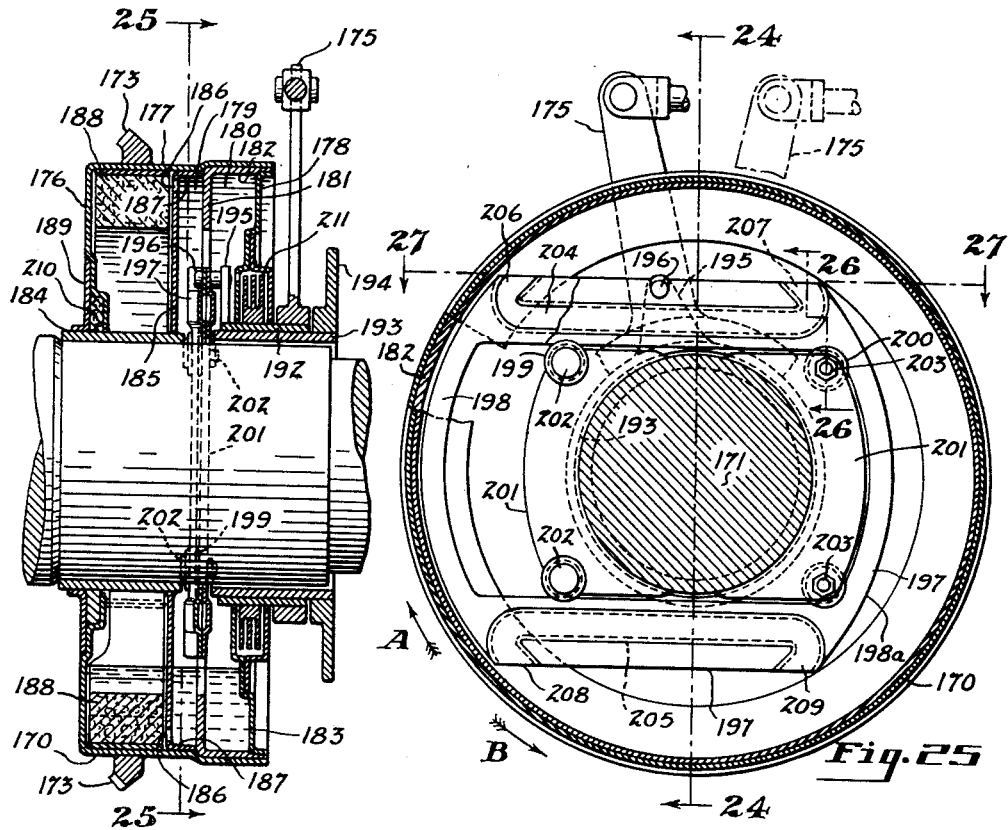
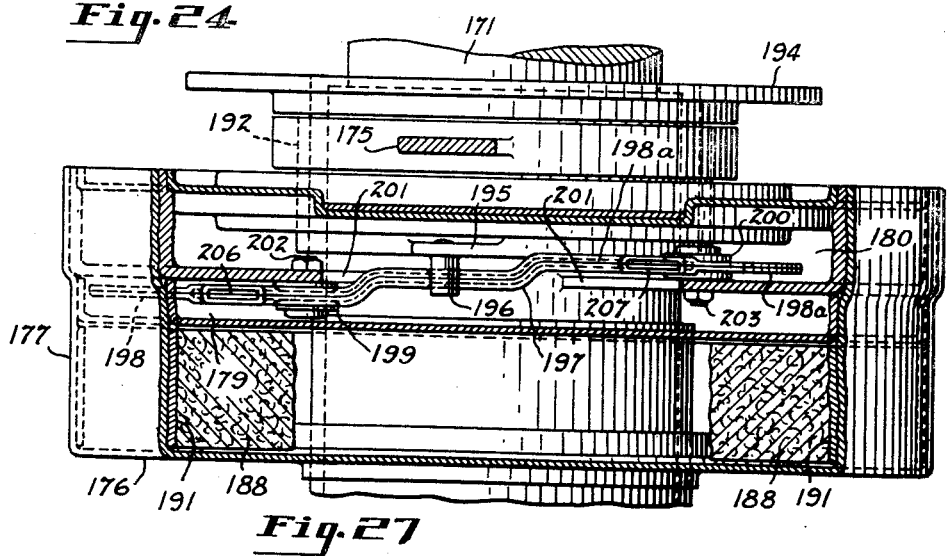
INVENTOR
*Everard F. Kohl*
BY *John Mahoney*
ATTORNEY Patented Aug. 15, 1950

2,518,478

UNITED STATES PATENT OFFICE 2,518,478

CENTRIFUGAL FLUID GOVERNOR

Everard F. Kohl, Cleveland, Ohio

Application May 16, 1942, Serial No. 443,207

17 Claims. (Cl. 264—19)

My invention relates to governors and more particularly to governors in which movement is imparted to an actuating mechanism by the drag or buoyant displacing force of a liquid. It also relates to the improved combination of a governor and a snap acting device, such as that disclosed in my copending application, Serial No. 383,436 filed on March 14, 1941.

In centrifugal governors which have heretofore been devised, it has been the practice to utilize a plurality of weights associated with an actuating mechanism. In such governors, the weights are thrown outwardly by centrifugal force during rotation of the governor and at a predetermined speed move the actuating mechanism to control the operation of means to be actuated, such as a valve or an electric switch. The weights in such governors, however, are usually controlled by springs and considerable difficulty has been experienced in adjusting the springs to provide proper actuation at the desired speed. The actuating mechanism is also forced outwardly with a jerky movement which often affects the accuracy of sensitive mechanism to be actuated.

It is the aim of the present invention to provide an improved governor of the centrifugal or centripetal type in which the actuating mechanism is moved by the drag or buoyant displacing force of a liquid, such as mercury. My invention also contemplates an improved combination of a governor and a snap acting device. According to my invention improved means are also provided to prevent movement of the actuating mechanism until after the governor has been operating for a predetermined time at a predetermined speed or for providing quick movement of the actuating mechanism when the governor attains a predetermined speed.

It is therefore an object of my invention to provide an improved governor in which movement of an actuating member is effected by the drag or buoyant displacing force of a liquid.

Another object of my invention is to provide an improved governor including an actuating mechanism in which means are provided to delay the movement of the actuating mechanism until after the governor has been operating at a predetermined speed for a predetermined period of time.

A further object of my invention is to provide a governor having an actuating mechanism in which improved means are provided to cause rapid movement of the actuating mechanism when the governor has attained a predetermined speed.

Another object of my invention is to provide an improved combination of a governor and a snap acting device in which adjustable means associated with the snap acting device are provided to prevent movement of the actuating mechanism of the governor until the governor has attained a predetermined speed.

A further object of my invention is to provide an improved governor for airplanes in which improved means are provided for controlling the pitch of the propeller blades.

A still further object of my invention is to provide an improved governor for airplanes in which the pitch of the propeller blades may be automatically controlled during flight or may be manually regulated at take off or during flight to maintain any desired engine speed.

My invention will be better understood by reference to the accompanying drawings in which:

Fig. 20 is a plan view of another modification of my improved governor with parts in section, showing the governor associated with the engine and propeller blades of an airplane;

Fig. 21 is a cross sectional view on the line 21—21 of Fig. 20, parts being broken away to show adjacent structure and parts being shown in elevation;

Fig. 22 is a reduced cross sectional view taken on a plane passing through line 22—22 of Fig. 21;

Fig. 23 is a view similar to Fig. 21, but showing the parts in a different position;

Fig. 24 is a cross sectional view taken on the line 24—24 of Fig. 25, showing parts in elevation;

Fig. 25 is a cross sectional view on the line 25—25 of Fig. 24, with parts broken away to show adjacent structure, the control lever being shown in full and dotted line positions to indicate the extent of its movement;

Fig. 26 is a detail view taken on a plane passing through line 26—26 of Fig. 25; and Fig. 27 is a cross sectional view on the line 27—27 of Fig. 25, showing a plan view of adjacent parts.

Figures 1, 2, 3, 4, 5:
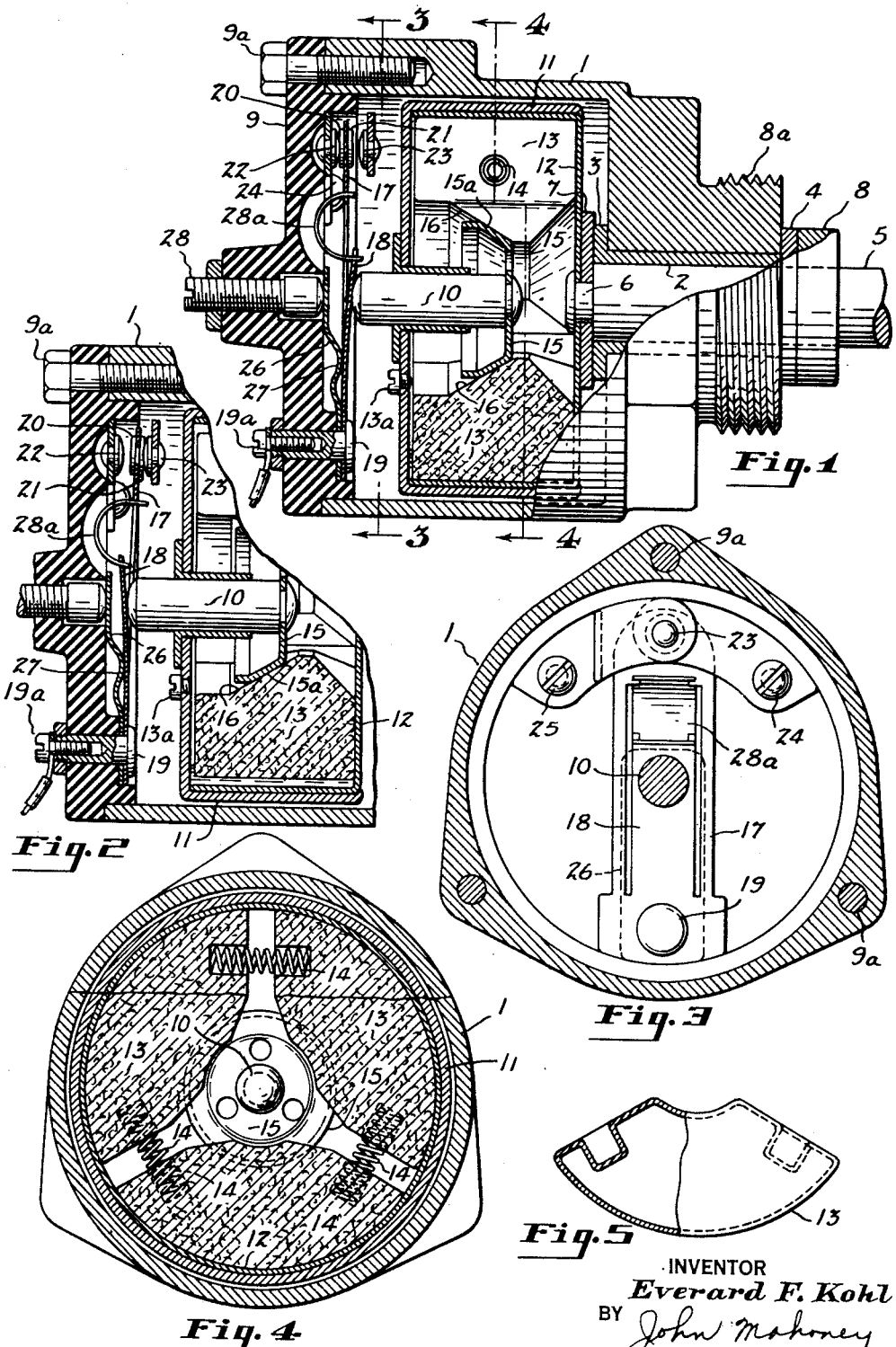
Fig 1 is a cross sectional view of one form of my improved governor showing its use in combination with a snap acting device.
Fig. 2 is a view similar to Fig. 1, with parts broken away, but showing the movable parts of the switch and governor in a different position.
Fig. 3 is a cross sectional view on the line 3—3 of Fig. 1, showing a plan view of the switch.
Fig. 4 is a cross sectional view on the line 4—4 of Fig. 1.
Fig. 5 is a detail view showing a modified form of a governor segment.

Broadly stated, my improved governor comprises a rotatable casing containing a liquid, and a disc subjected to the drag of the liquid or one or more segmental blocks which are capable of being buoyed inwardly by the displacing force of the liquid during the rotation of the casing at a predetermined speed. It may be utilized alone, or in combination with other accessories or in association with various devices to be controlled, such as engines, turbines, compressors or the like, for regulating the supply of working fluid. It may also be utilized in association or combination with snap acting devices to supply or interrupt the current to electrical apparatus, such as solenoids, in association with valves for regulating the supply or discharge of fluid for any desired purpose, or in combination with the engine and the propeller of airplanes to control the pitch of the propeller blades. It will therefore be understood that the apparatus disclosed in the accompanying drawings is merely illustrative of various forms and applications of my invention and is not in any sense to be considered as limiting.

One form of my improved governor is shown in Figs. 1 to 4 and while the governor may be utilized in association or combination with any suitable device to be actuated, for purpose of illustration, it is shown in combination with a snap acting device for making or interrupting an electrical circuit. As illustrated, the governor is supported in a housing 1 having a central opening in which a bearing 2 having inner and outer annular flanges 3 and 4, respectively, is journalled for receiving the shaft 5 of a prime mover for rotating the governor. The inner portion of the shaft is connected to and serves to support the governor in spaced relation to and against endwise movement within the housing. For this purpose, the end of shaft 5 is reduced to provide a portion 6 which extends through a thrust washer 7 engaging flange 3 of the bearing and through an aperture in one end of the casing and is riveted or otherwise secured against the inner end of the casing. The shaft 5 is also provided with a thrust washer 8 which bears against flange 4 of the bearing.

One end of the housing is threaded at 8a for stationary connection to any suitable part of the apparatus with which the governor is associated and its opposite end is provided with a cover 9 formed of electrical insulating material, such as molded material, which is secured to the housing by suitable means, such as bolts 9a. The cover supports a snap acting switch which as illustrated maintains an actuating pin 10 forming part of my improved governor inwardly when the governor is at rest or is rotating at low speed and which is adapted to be actuated by pin 10 when the governor attains a predetermined speed.

The governor, as illustrated, consists of a rotatable casing formed of telescoping parts 11 and 12 welded or otherwise secured together and contains a plurality of segmental blocks 13 which are normally maintained in engagement with the inner periphery of the casing by means of springs 14 and the inner portion of the actuating mechanism. The casing also contais a liquid capable of buoyantly forcing the blocks 13 radially inward during the rotation of the casing at a predetermined speed which may be introduced through an aperture normally closed by a removable plug 13a. The blocks are preferably formed of a comparatively light material, such as asbestos, wood, carbon, molded material, or hollow metal, such as illustrated in Fig. 5, or may even be formed of solid metal, when a comparatively heavy liquid, such as mercury, is utilized. Preferably, I utilize a light molded material, such as asbestos or wood flour bound together by a phenolic condensation product and a heavy liquid, such as mercury, although oil or other liquid may be employed if it has a higher specific gravity than the blocks.

When the governor is at rest, the liquid settles in the bottom of the casing. During rotation of the casing, however, the liquid is picked up by the inner periphery of the casing and the outer periphery of the blocks and the blocks are buoyed radially inward by the liquid with a force depending upon the composition of the blocks, the depth of their immersion in the liquid, and the rotative speed of the casing.

As the blocks are moved radially inward, they force actuating pin 10 axially outward against the resilient action of the switch and for this purpose the inner portion of the actuating pin is provided with a shifter cone 15, the conical surface or inner face 15a of which is adapted to be engaged by an inclined surface 16 on each of the segmental members. In this construction, the pin 10 and shifter cone 15 are to be considered the actuating mechanism.

While my improved governor may be employed with any type of switch or other device having means for maintaining the actuating pin of the governor in its innermost position when the governor is at rest or rotating at low speeds, or resilient means may be arranged between the inner portion of the casing and the shifter cone for such purpose, as illustrated in Figs. 1 to 4 of the drawings, it is shown utilized in combination with a switch which prevents outward movement of the actuating pin until the governor attains the desired speed. For this purpose, a switch based upon the principles disclosed in my copending application is particularly suitable. As illustrated, the switch is provided with an arm 17 and a lever or arm 18 which are preferably formed as a single stamping from a sheet of flexible metal and one end of which is attached to cover 9 by suitable means, such as a bushing 19 internally threaded to receive a terminal screw 19a. The arm of the switch is provided with contacts 20 and 21 on opposite faces which extend between spaced contacts 22 and 23 mounted on the cover by means of bushings provided with terminal screws 24 and 25. It will of course be understood that if it is desired to make and break only one circuit, either contact 20 or 21 may be utilized as a stop.

As illustrated, the lever 18 is normally biased inwardly from arm 17 into engagement with actuating pin 10 of the governor by a flexible arm 26 supported at one end by bushing 19 and provided with a curved portion 27 which is forced against lever 18 by an adjustable screw 28, the base of which bears against the free end of arm 26 and also by a spring 28a interposed between and held under compression by supports formed on the free ends of the arm and the lever and which is loosely connected therewith to permit limited rocking movement of the spring upon its supports in either direction from a critical position as illustrated and described more specifically in my copending application. In the preferred form of my invention spring 28a is formed of stronger material than lever 18 and consequently bends the end of lever 18 extending beyond plunger 10 into a curvilinear shape so that when the switch is actuated by pin 10, lever 22 is thrown with a whip-like action to cause rapid movement of arm 17, thereby minimizing volatilization of the contacts.

As shown in Fig. 1 when the governor is at rest or is rotating at a predetermined low speed, spring 28a normally maintains contact 20 in engagement with contact 22 and the segmental blocks are forced into engagement with the inner periphery of the casing by springs 14 and by the conical portion 15a of shifter cone 15 which engages the inclined portions 16 of the blocks. During the rotation of the governor, however, the inner periphery of the casing and the outer periphery of the blocks pick up the liquid and when the governor attains sufficient speed, the buoyant force of the liquid overcomes the force of springs 14 and spring 28a, and blocks 13 are moved radially inward, forcing the inclined portions 16 of blocks 13 into engagement with the inclined portion 15a of shifter cone 15 to move actuating pin 10 outwardly against the force of lever 18, thereby actuating the switch to make or break an electrical circuit or to break one and make another electrical circuit. As screw 28 is adjustable, it is apparent that the rotative speed at which the governor actuates the switch may be readily varied.

Figure 6:
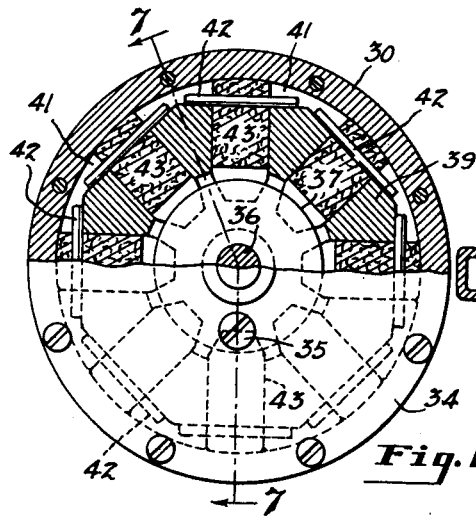
Fig. 6 is a view of a modified form of my improved governor taken on a plane extending through the line 6—6 of Fig. 7 and showing the governor partially in side elevation and partially in section.
Figure 7:
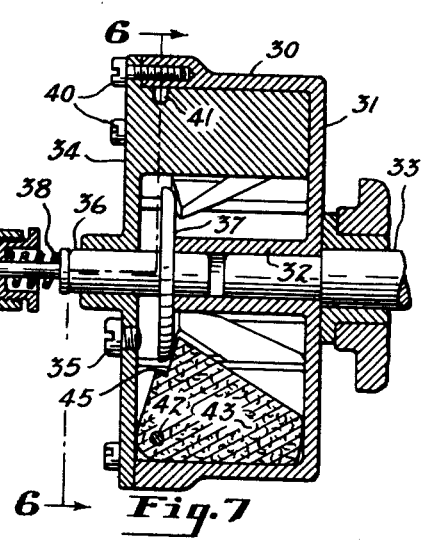
Fig. 7 is a cross sectional view of the governor shown in Fig. 6 taken on the line 7—7 of Fig. 6, and a cross sectional view with parts in elevation of a valve associated therewith.
Figure 12:
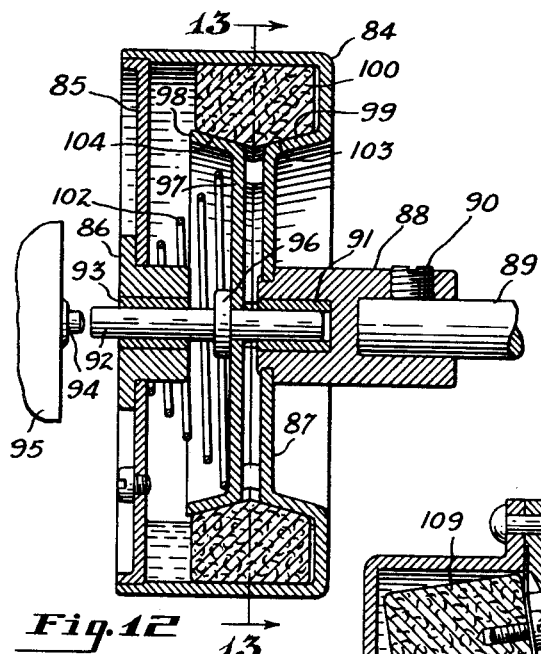
Fig. 12 is a cross sectional view of another modification of my improved governor with parts in elevation, the governor being shown in association with a snap acting switch.

A modified form of my improved governor is shown in Figs. 6 and 7. As illustrated, the governor is utilized to actuate a valve when rotated at a predetermined speed and comprises a casing including an annular body portion 30 and an end 31 having a reentrant tubular hub 32 forming a bearing for a shaft 33 of a motor, or other prime mover, which may be splined or otherwise secured to hub 32. A cover 34 is secured to the casing by any suitable means, such as screws 40, and has an aperture normally closed by a threaded plug 35 through which a liquid, such as mercury, may be introduced into the casing. The cover also has a central opening for receiving an actuating pin 36, one end of which extends exteriorly of the casing and the other end of which extends within hub 32. Actuating pin 36 is provided with an annular flange or disk 37 which is normally forced against the end of tubular hub 32 by a spring 38 which may be arranged exteriorly or interiorly of the casing. As illustrated, spring 38 is arranged exteriorly of the casing and normally maintains a valve in closed position although if desired spring 38 may be arranged interiorly of the casing between the cover and disk as shown in Figs. 8, 9 and 12 to be subsequently described in which case the valve may be maintained in a normally open position by suitable means, such as a spring, and closed when the actuating pin is moved outwardly.

According to my invention, means are provided to force actuating pin 36 outwardly against the resilient action of spring 38 when the governor attains a predetermined speed. For this purpose, a plurality of spacers 39 are formed integral with the cover or otherwise affixed thereto. Each of the spacers is provided at the end in proximity to cover 34 with a recess 41 and arranged between the spacers and supported thereby are a plurality of segmental blocks 43, preferably formed of a light material, such as asbestos or other filler bound together by a phenolic condensation product, each of which is pivotally mounted at one end by means of a pin 42 extending through an aperture in the blocks and the opposite ends of which extend beyond the blocks into the recesses 41 formed in adjacent spacers.

Each of the blocks is provided with an offset portion 45 against which the inner face of disk 37 of actuating pin 36 is adapted to bear to hold the free end of the blocks adjacent to or in proximity to the inner periphery of the casing when the pin is in its innermost position. When the casing is rotated, the mercury or other liquid is picked up by the inner periphery of the casing and the outer periphery of the blocks and the free ends of the blocks are thrown outwardly by centripetal force. When the casing is rotated at sufficient speed, however, the free ends of blocks 43 are forced inwardly by the buoyant action of the liquid, forcing disk 37 and actuating pin 36 axially outwardly to open the valve against the action of spring 38. When the casing comes to rest, the mercury settles in the bottom of the casing and spring 38 forces actuating pin 36 and disk 37 inwardly, returning the blocks to their original position. In this modification, the actuating mechanism consists of pin 36 and disk or flange 37.

Figure 8:
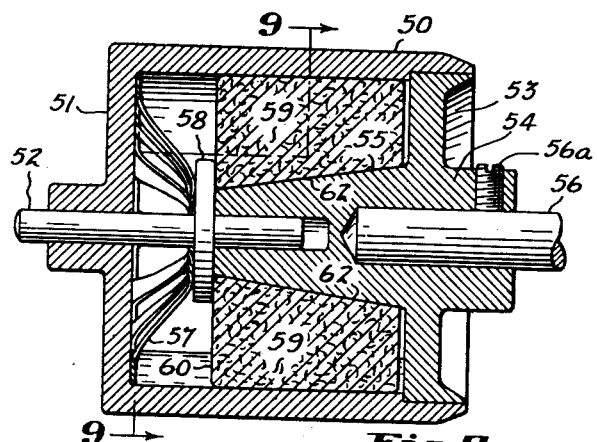
Fig. 8 is a cross sectional view of another modified form of my improved governor with parts shown in elevation.
Figure 9:
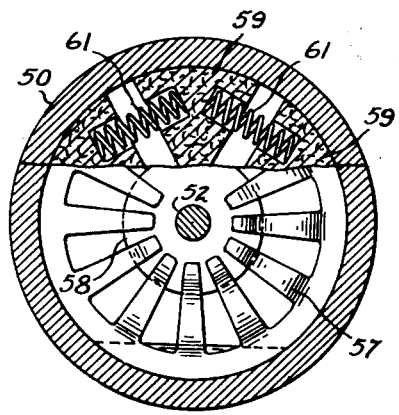
Fig. 9 is a cross sectional view taken on the line 9—9 of Fig. 8.

Another modification of my invention is shown in Figs. 8 and 9 in which means are provided to delay movement of the actuating mechanism for a predetermined time after the casing has attained sufficient speed to cause initial movement of the segmental blocks. As shown in the drawings, the casing comprises an annular body portion 50 having an end 51 formed integrally therewith, which is provided with a central opening to receive actuating pin 52, and a cover 53 welded or otherwise secured to the body portion. The cover is provided with an outwardly extending hub 54 having a bore to receive the shaft 56 of a prime mover which may be splined or otherwise affixed thereto, such as by set screw 56a. The cover is also provided with an inwardly extending frusto-conical portion 55 having a bore to receive the inner end of actuating pin 52 which is normally urged inwardly by resilient means, such as a spring 57, which bears against a disk or flange 58 formed upon the actuating pin and forces the disk inwardly against the end of the frusto-conical portion 55.

As in the other modifications, the casing contains a heavy liquid, such as mercury, and means are provided to move actuating pin 52 outwardly when the casing attains a predetermined speed. In this modification, however, the actuating pin is not moved outwardly until after the prime mover has been operating at the predetermined speed for a substantial period of time. For this purpose a plurality of segmental blocks 59, preferably formed of a light material, such as one of those specified, is provided which are normally maintained against the inner periphery of the casing by means of springs 61, and the inner surface 62 of which have the same degree of inclination as the outer surface of the frusto-conical portion 55. The segmental blocks are arranged between the cover 53 and the disk 58 and when the casing is rotated at a predetermined speed, the surfaces 60 of the segmental blocks are forced inwardly by the buoyant action of the liquid against the conical surface of portion 55 and are gradually forced down the inclined surface, engaging the inner face of disk 58 and moving actuating pin 52 outwardly against the action of spring 57. When the casing comes to rest springs 57 and 61 return the parts to their original position. The time which elapses after the casing has been brought to the desired speed and the time at which pin 52 is moved the desired distance to actuate the means to be controlled may be varied by varying the degree of inclination of the surface 62 of the frusto-conical member 55 and the inner surface of blocks 59, less time being required when the inclination is increased and more time being required when the inclination is less. In this modification pin 52 and disk 58 constitute the actuating mechanism.

Figure 10:
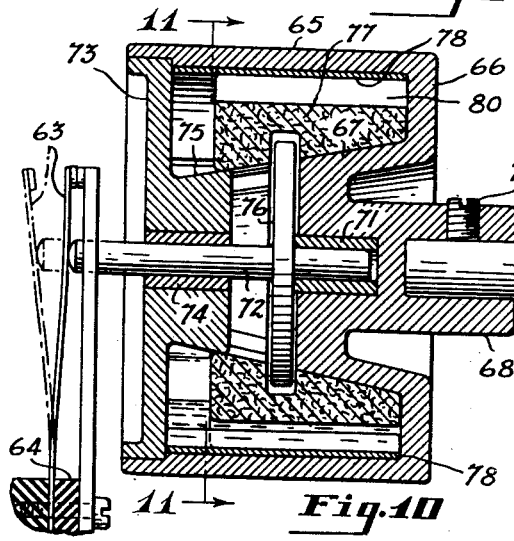
Fig. 10 is a cross sectional view of a still further form of my improved governor shown in association with a switch, with parts in elevation.
Figure 11:
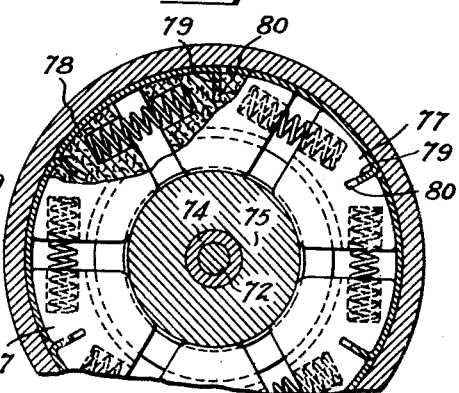
Fig. 11 is a sectional view on the line 11—11 of Fig. 10 with parts in elevation and parts broken away to show adjacent structure.

Another modification of my invention is shown in Figs. 10 and 11 which is somewhat similar to that shown in Figs. 8 and 9 but is of the type in which the actuating pin is adapted to be held in its inner position by the resilient action of a spring or arm arranged exteriorly of the casing, such as a spring which normally maintains a valve in closed position as shown in Fig. 7 or the spring lever 63 of a switch 64 which is actuated to break a current when the casing is rotated at a predetermined speed.

As illustrated the casing comprises a body portion 65, and an end 66 which is preferably formed integral therewith and is provided with a frusto-conical projection 67 extending within the casing and an outwardly extending hub 68 provided with a bore to receive the shaft 69 of a prime mover which may be splined or secured thereto by other suitable means, such as a set screw 70. The opposite end of the projection 67 is also provided with a bore having a bearing 71 which receives one end of an actuating pin 72, the other end of which projects through an opening in cover 73 which may be welded or otherwise secured to body portion 65 and the opening in which is provided with a bearing 74 for the actuating pin. The cover is also provided with a conical shaped projection 75 having the same degree of inclination as projection 67. Actuating pin 72 is provided with a flange or disk 76 which is normally urged against the end of projection 67 by spring lever 63 and means are provided for engaging the inner face of disk 76 and forcing actuating pin 72 outwardly against the force of lever 63 when the casing acquires a predetermined speed. For this purpose, a plurality of segmental blocks 77 formed of a light material, such as one of those specified, are interposed between the inclined surfaces of conically inclined projections 67 and 75 and the inner periphery of the casing. The inner surface of the blocks are provided with grooves to receive the outer peripheral portion of the disk 76 and the lower portion of the blocks are inclined at the same angle as the outer surface of projections 67 and 75. The blocks, however, terminate a substantial distance from cover 73.

While it is not essential, the blocks may be rotated with the casing and while any suitable means may be provided for this purpose, such as projections extending inwardly from the casing, I preferably utilize a plurality of arcuate-shaped members 78 which are welded or otherwise secured to the inner periphery of the casing and which have inwardly extending flanges 79 which fit into longitudinally extending grooves 80 formed in the outer periphery of the blocks.

The operation of my improved governor is similar to that disclosed in Figs. 8 and 9. When casing 65 is rotated, blocks 77 are first thrown outwardly by centrifugal force. When the casing attains a predetermined speed, however, the liquid buoyantly forces the blocks inwardly against the inclined surfaces of projections 67 and 75 and as the buoyant force of the mercury increases as a result of a further increase of speed, the blocks slide down the inclined surfaces engaging the inner face of disk 76 and forcing actuating pin 72 outwardly. It will be noted that the surfaces of projections 67 and 75 have a greater degree of inclination than the surface 62 of projection 55 shown in Fig. 8 and consequently the movement of the blocks down the inclined surface will commence at a lower speed than those shown in Fig. 8. In this modification, pin 72 and disk 76 constitute the actuating mechanism.

Figure 13:
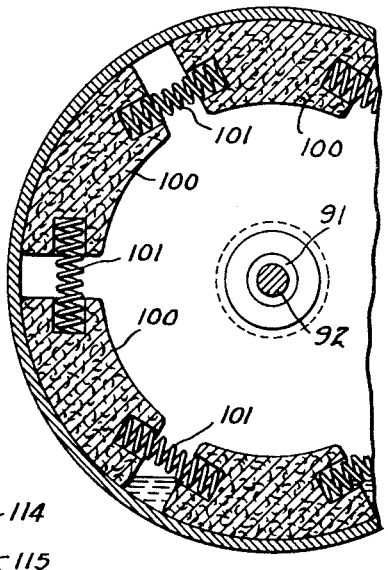
Fig. 13 is a cross sectional view on the line 13—13 of Fig. 12.

Another modification of my invention is shown in Figs. 12 and 13 of the drawing. As illustrated, the governor comprises a casing 84 having a cover 85 welded or otherwise secured thereto provided with a central bushing 86 and an end 87 to which hub 88 is secured by any suitable means. As illustrated, the hub 88 has a reduced portion extending through an opening in the casing which is riveted or otherwise secured thereto and is provided with a bore to receive the shaft of a suitable prime mover 89 which may be affixed to the hub by suitable means, such as set screw 90. The other end of the hub is also provided with a bore lined with a bearing 91 which is adapted to receive one end of an actuating pin 92, the other end of which is adapted to extend through a bearing 93 formed in bushing 86.

As in previous modifications, the casing contains a heavy liquid, such as mercury, which may be introduced into the casing in a similar manner and means are provided to force actuating pin 92 outwardly into engagement with any desired member to be actuated. As illustrated, the member to be actuated is the plunger 94 of an electric switch which may be enclosed in a box 95 shown diagrammatically as it forms no part of the present invention. For this purpose, actuating pin 92 is provided with a disk 96 welded or otherwise secured to a shifter cone 97 having a conically-shaped flange 98, the inner face of which cooperates with an outwardly inclined portion 99 on end 87 of the casing and the periphery of the casing to form a chamber for a plurality of segmental blocks 100 which are normally urged toward the periphery of the casing by springs 101 interposed between and the ends of which fit into recesses in adjacent blocks and also by a spring 102 which normally urges shifter cone 97 toward end 87 when the casing is at rest or is rotating at low speeds. The inner portion of each of the segmental blocks is provided with oppositely inclined portions 103 and 104 having the same degree of inclination as flange 98 and bevelled portion 99 and during rotation of the casing the liquid is picked up by the inner periphery of the casing and the outer periphery of the blocks and when the casing is rotated at sufficient speed to cause the buoyant force of the liquid to overcome the force of springs 101 and 102, blocks 100 are moved radially inward. During the inward movement of the blocks, the inclined portion 104 of each of the blocks 100 engages flange 98 and the inclined portion 103 of each of the blocks slides along the inclined portion 99 of end 87, moving shifter cone 97 axially against the tension of spring 102, thereby forcing pin 92 into engagement with plunger 94. When the casing comes to rest, the liquid settles in the bottom of the casing and springs 101 and 102 cooperate to return the parts to their original position. In this modification, the actuating mechanism consists of the pin 92, disk 96, and shifter cone 97.

Figures 14, 15:
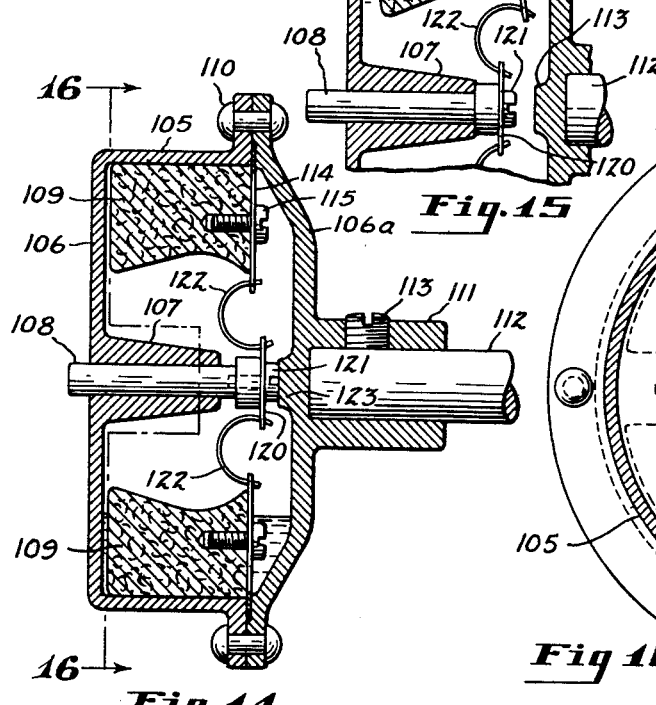
Fig. 14 is a cross sectional view of a further modification of my improved governor showing snap acting means for moving the actuating member when the governor attains a predetermined speed.
Fig. 15 is a detail view of the governor shown in Fig. 14 with the parts in a different position.
Figure 16:
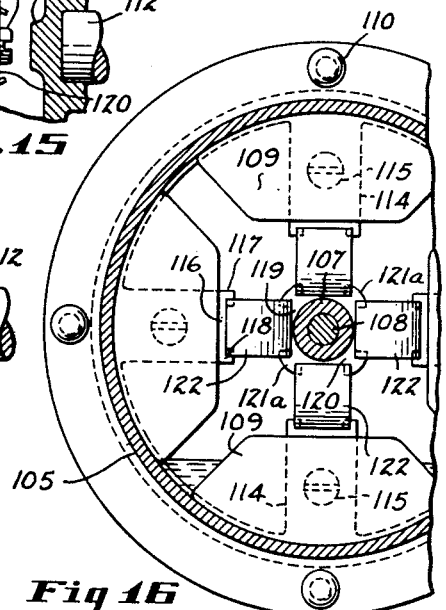
Fig. 16 is a sectional view on the line 16—16 of Fig. 14, showing adjacent parts in side elevation.

Figs. 14, 15 and 16 disclose another modification of my invention in which the actuating mechanism is forced outwardly with a snap action when the casing attains a predetermined speed. As illustrated the casing comprises a body portion 105 having an end 106 formed integrally therewith which is provided with an inwardly extending hub 107 bored to receive an actuating pin 108. The casing is provided with a cover 106a secured thereto by suitable means, such as bolts 110, and is provided with an outwardly extending hub 111 bored to receive the shaft 112 of a prime mover which is secured thereto by suitable means, such as set screw 113.

The casing contains a liquid, such as mercury, which may be introduced in the manner specified in preceding modifications and the governor is adapted when rotated at a predetermined speed to force actuating pin 108 outwardly with a snap action. For this purpose a plurality of segmental blocks 109, formed preferably of a light molded material, are arranged in the casing, one end of each of which is provided with a strip 114 of flexible metal which may be attached thereto by suitable means, such as a threaded bolt 115. The flexible strip extends beyond the block at both ends, the outer end of the strip being interposed between the body and cover 106a and the inner extension being provided with a central support 116, see Fig. 16, and a pair of side projections 117 and 118. Arranged opposite the support 116 on each strip is a support 119 formed on a metal bracket 120 secured to actuating pin 108 by suitable means, such as a bolt 121. As illustrated, the bracket is substantially square and is provided with four supports and an arcuate-shaped projection 121a extending from each corner. Interposed between each of the cooperating supports 116 and 119 is a normally flat spring 122 having notches adjacent its opposite ends. During assembly, the spring is bent into an arcuate shape with one portion of the arc bearing on support 116 and another portion of the arc bearing on support 119 with projections 117 and 118 on strip 114 extending loosely into the notches arranged adjacent one end of the spring and the opposite sides of projections 121a extending loosely into the notches arranged adjacent the other end of the spring when the parts are in a critical position. Spring 122 is similar to spring 28a, a front view of which is shown in Fig. 3.

When the governor is at rest, the mercury settles in the bottom of the casing and springs 122 normally maintain the outer portion of the segmental blocks in engagement with the inner periphery of the casing and actuating pin 108 in its inner position with the head of bolt 121 abutting a lug or projection 123 formed on the cover. When the casing is rotated, however, the inner periphery of the casing and the outer surface of blocks 109 pick up the liquid and when the casing attains a predetermined speed blocks 109 are moved centripetally inwardly, rocking springs 122 on their supports and flexing each of the metal strips 114 to and beyond its critical position. When metal strips 114 are moved beyond their critical position, the direction of the force of springs 122 changes and actuating pin 108 is forced outwardly with a snap action, flexing the metal strips still further as shown in Fig. 15 of the drawing. When the casing comes to rest, the flexible strips 114 return to their normal position and as they pass their critical position, actuating pin 108 is returned to its normal position with a snap action. In this modification, the actuating mechanism includes pin 108 and disk 120.

Figures 17, 18:
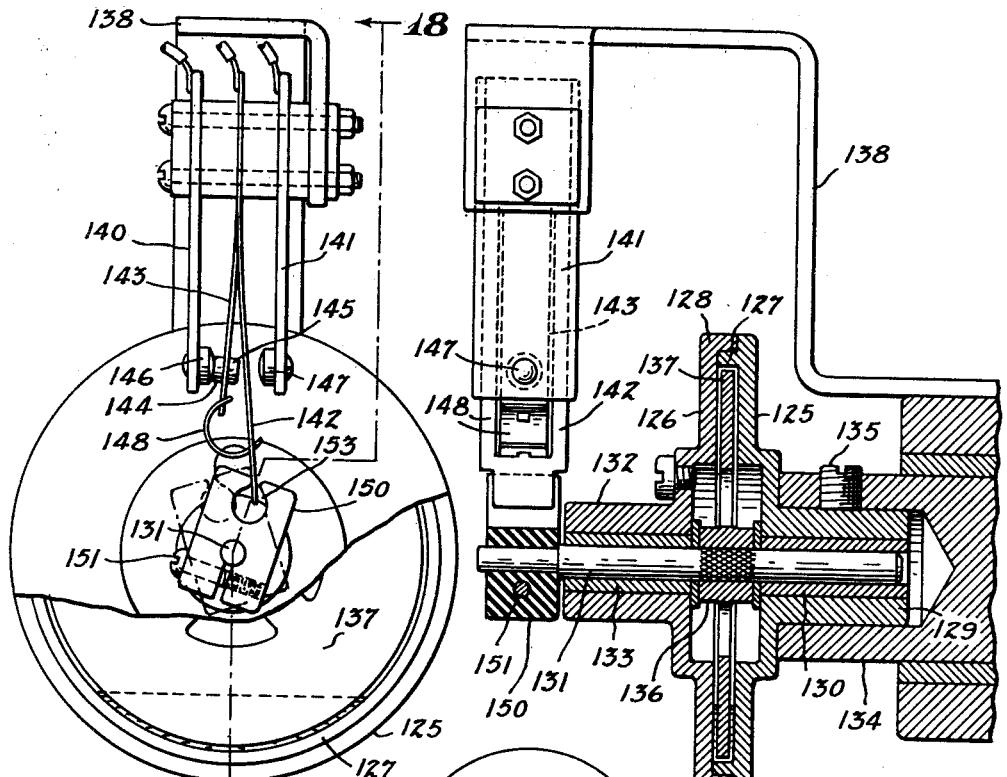
Fig. 17 is an end view of another form of my improved governor, showing it associated with a snap acting switch.
Fig. 18 is a cross sectional view of the governor shown in Fig. 17 taken on the line 18—18 of Fig. 17, showing a side elevational view of the switch.
Figure 19:
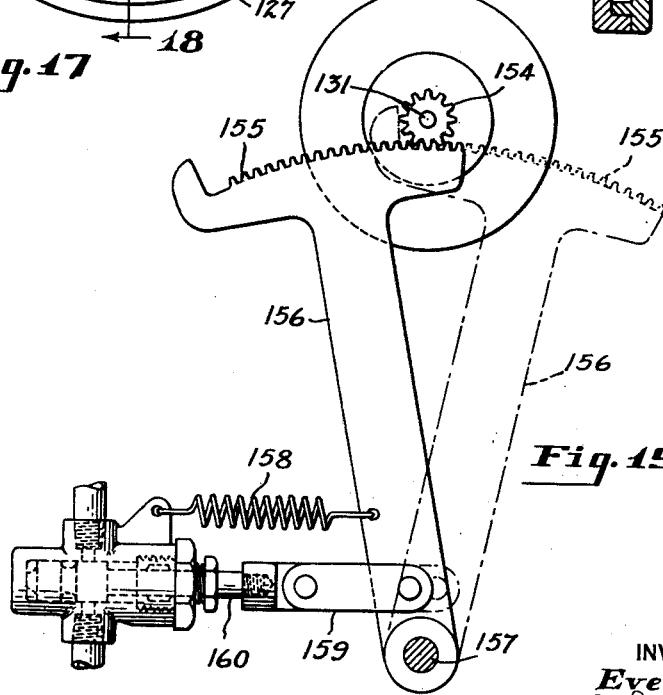
Fig. 19 is an end view of a governor similar to that shown in Fig. 17, but showing a pinion associated with the driven member in operative association with a valve.

Another modification of my improved governor is disclosed in Figs. 17 to 19. As shown, the governor includes a casing formed of side portions 125 and 126 provided with telescoping flanges 127 and 128 at their peripheral portion. Side portion 125 has an axially projecting hub 129 provided with a bore lined with a bearing 130 which is adapted to receive one end of a shaft 131 to be driven, the other end of which shaft extends through an alined bore in a hub 132 projecting from side wall 126 which is also provided with a bearing 133.

The casing is adapted to be driven by any suitable means and the parts of the governor are so arranged that when the casing is at rest or rotated below a predetermined speed, driven shaft 131 remains at rest but when the casing is rotated at or above a predetermined speed, shaft 131 is rotated. As illustrated, the casing may be rotated by any suitable prime mover, such as an electric motor provided with a shaft 134 having a bore to receive hub 129 and which is affixed thereto by suitable means, such as a set screw 135. Shaft 131 to be driven is provided with a knurled surface within the casing to receive a fixed hub 136 having spokes extending radially therefrom which terminate in a disk 137 arranged between and substantially filling the casing between the sides 125 and 126. When the governor is at rest, the mercury settles in the bottom of the casing. During rotation of the driving shaft, however, the mercury is picked up by the periphery of the casing and as an annulus of the mercury is formed, the outer periphery of disk 137 is submerged and when the casing is rotated at a predetermined speed, depending upon the amount of mercury in the casing, the drag of the mercury causes rotation of disk 137 and driven shaft 131.

According to my invention, means are provided to actuate a switch or valve when the casing is rotated at the predetermined speed, the valve or switch being adapted to return to its normal position when the casing is at rest or falls below a predetermined speed.

While a switch of any desirable type which returns to its normal position after actuation may be utilized, as illustrated in Figs. 17 and 18, the snap acting switch is of the type disclosed in my copending application. As shown, the switch is supported from the casing of the driving member by a suitable bracket 138 and includes contact arms 140 and 141, an actuating lever 142 and an arm 143 to be actuated having contacts 144 and 145 on opposite faces thereof which are adapted to selectively engage contacts 146 and 147 arranged on the inner surface of arms 140 and 141, respectively, during movement of the actuating lever. As illustrated more particularly in my copending application, lever 142 is normally biased toward arm 141 to maintain contact 144 in engagement with contact 146 by means of an arcuate-shaped spring 148 having apertures in its opposite ends which loosely receive projections extending from arms 143 and lever 142 when the switch is in its critical position.

For the purpose of actuating the switch, shaft 131 is provided with a bracket 150 attached thereto by any suitable means, such as a bolt 151 and which is provided with a recess 153 to receive the free end of actuating lever 142 of the switch. As will be apparent from the drawing, when the governor attains the desired speed, bracket 150 is rotated to its dotted line position actuating the switch to cause contact 145 to engage contact 147 and when the governor falls below its predetermined speed or comes to rest, lever 142 will return to the position shown in Fig. 17, returning the parts to their original position.

Instead of actuating a switch, my improved governor may be utilized to actuate other apparatus, such as a valve. While any suitable means may be provided for this purpose, as illustrated in the drawings, shaft 131 is provided with a pinion 154 which meshes with a rack 155 formed upon a lever 156 pivotally supported at 157. As shown, the valve is normally maintained in a normally closed position by any suitable means, such as a spring 158. When the governor attains a predetermined speed, however, lever 156 is moved to the right as shown in Fig. 19 by the cooperative action of pinion 154 and rack 155, and a link 159 attached to lever 156 and valve stem 160 opens the valve. When the speed of the governor falls below its predetermined speed or is at rest, spring 158 returns the parts to their normal position.

Another modification of my governor is shown in Figs. 20 to 27 of the drawings, the governor being associated with the driving shaft and the propeller blades of an airplane. As well known in the aeronautical art, during take-off or when climbing, a low blade pitch is usually desirable while at level flight or in diving, a higher pitch is more efficient. In this modification, improved means are provided to control the pitch of the propeller blades.

As shown, the governor comprises a casing 170 mounted for limited rotation on the driving shaft 171 of the engine and is provided with bevel gear segments 173 on its outer periphery, each of which meshes with a bevel gear 174 affixed or connected to each propeller blade 172 to control their pitch upon movement of a control lever 175 in opposite directions from a neutral position, although as will be fully explained as the specification proceeds, control lever 175 may be initially set at take off or in flight and my improved governor will control the pitch of the propeller blades during flight to maintain any desired engine speed.

As illustrated more particularly in Figs. 24 to 27, my improved governor comprises a side portion 176 terminating in a peripheral portion 177 to which a cover 178 is secured by suitable means, such as welding. The casing is divided into a working chamber 179 and an auxiliary or reserve chamber 180 by suitable means, such as an inwardly extending partition 181 having a central opening and an annular flange 182 which is secured to the inner periphery of the casing by any desirable means, such as welding.

The casing contains a suitable liquid, such as mercury, as indicated by the numeral 183, and means are provided to control the pitch of the propeller blades in accordance with the quantity of liquid present in the working chamber which is regulated by control lever 175 in a manner to be subsequently described. For this purpose a sleeve 184 is affixed to the engine shaft and is provided at its inner portion with an outwardly extending flange 185 having a plurality of openings 186 adjacent its periphery and an angle portion 187 arranged in proximity to the inner periphery of the casing but spaced sufficiently therefrom to provide clearance for the rotation of the casing. Flange 185 cooperates with side portion 176 to provide a chamber for a plurality of segmental members or blocks 188 arranged between and adapted to abut against partitions 189 secured to and extending radially from sleeve 184 and flanges 190 extending radially inwardly from a lining 191 secured to the inner periphery of the casing. Segmental blocks 188 are formed of a material having a lower specific gravity than the liquid. Any suitable material may be utilized for the purpose, such as wood, hollow metal, molded material or the like.

During rotation of the engine shaft, the propeller is revolved in the usual manner and the propeller blades through their bevel connection with the casing rotate the casing in unison with the engine shaft. When a liquid, such as mercury, is present in working chamber 179, however, it is picked up by the inner periphery of angle portion 187 during the rotation of the casing and passes through openings 186 into the segment chamber, forming an annulus of liquid therein. The segmental blocks are also thrown outwardly by centrifugal force but when sufficient liquid is present and the casing is being rotated at sufficient speed, the segments are buoyed radially inwardly with a force depending upon the rotative speed of the casing and the depth to which the segmental blocks are immersed. During the inward movement of the segmental blocks, one end portion of each block engages one of the inwardly extending flanges on the lining of the casing and the casing is not only rotated with the shaft but relative thereto and bevel gear segments 173 meshing with bevel gears 174 vary the pitch of the propeller blades.

Since the pitch is dependent upon the depth of immersion of the segmental blocks in the mercury and the rotative speed of the casing which latter factor is also dependent upon the rotative speed of the engine, it will be apparent that at higher speeds, the propeller blades will automatically acquire a higher pitch which is most efficient at level flight or when diving. It will also be apparent that when the rotative speed of the engine shaft slows down, the force of the air on the propeller blades overcomes the centrifugally-developed inward buoyant force of the liquid and the blocks are forced outwardly, thus providing a lower pitch.

One of the essential features of my invention is to provide means for controlling the engine speed by varying the pitch of the propeller blades during flight. This may be effected by setting the control lever at such a position that during take off or during flight, the amount of mercury that remains in or is transferred to working chamber 179 is sufficient to cause the proper inclination of the propeller blades to maintain the desired engine speed.

To provide means for regulating the quantity of liquid in working chamber 179, control lever 175 is affixed to a sleeve 192 forming a control device which is rotatably mounted upon a stationary bearing 193 having an outwardly extending flange 194 which may be connected to the casing of the engine as illustrated in Fig. 20. Sleeve 192 extends into the reserve chamber of the casing and is provided with a lug 195 having an inwardly extending pin 196 secured thereto which fits into a notch in a liquid transfer device designated generally in Fig. 24 by the numeral 197.

The liquid transfer device is designed to transfer liquid from auxiliary chamber 180 to working chamber 179 when the control lever is moved in one direction from a neutral position and to transfer liquid from working chamber 179 to auxiliary chamber 180 when the control device is moved in the opposite direction from a neutral position, and while any suitable liquid transfer means may be employed, such as one of those disclosed in my copending application, Ser. No. 309,271 filed on December 14, 1939, which has matured into Patent No. 2,307,797, as illustrated in the drawing, the liquid transfer device is formed from a pair of mating stampings secured together by any suitable means, such as spot welding, and has an end portion 198a offset in one direction to extend into reserve chamber 180 and an end portion 198 offset in the opposite direction to extend into working chamber 179. The stampings are provided with a central opening forming inner side edges which ride upon rollers 199 and 200 affixed to guides 201 by means of bolts 202 and 203, as shown more particularly in Figs. 25 and 26 of the drawing. Guides 201 may be welded or otherwise secured to the inner portion of bearing 193 and to compensate for the offset end portions, rollers 199 are arranged on one side of one of the guides whereas rollers 200 are arranged on the opposite side of the other guide.

The central opening in the stampings is considerably longer than the guides to permit limited longitudinal movement of the liquid transfer means in the casing and the stampings are arranged in juxtaposition to each other with the exception that at the upper and lower portions of the stampings, substantially U-shaped indentations opposed to each other are formed in the stampings to provide substantially straight tubular portions 204 and 205 which terminate in oppositely inclined arcuate-shaped passages. As illustrated in the drawings, passages 206 and 207 of the upper tubular portion are inclined upwardly and the passages 208 and 209 of the lower tubular portion are inclined downwardly to facilitate transfer of liquid between the chambers without excessive splashing, irrespective of the direction of rotation of the casing. For instance, assuming that the liquid is in working chamber 179 and it is desired to transfer it to reserve chamber 180, control device 175 is moved from its neutral to its full line position, as shown, and when the casing is rotated in the direction indicated by arrow A, liquid scooped from the casing enters tube 205 through passage 208 in a direction substantially tangential to the direction of rotation of the liquid and is discharged through passage 209 into reserve chamber 180 in a direction which is substantially tangential to the direction of rotation of the liquid. On the other hand when the casing is rotated in the direction indicated by arrow B, liquid scooped from the casing enters tube 204 from working chamber 179 through passage 206 in a direction which is substantially tangential to the direction of rotation of the liquid and is discharged into reserve chamber 180 through passage 207 in a direction which is substantially tangential to the direction of rotation of the liquid. When control lever 175 is moved to the dotted line position, it moves the liquid transfer device into engagement with the opposite guide 201 and liquid is transferred from reserve chamber 180 to working chamber 179, irrespective of the direction of rotation of the liquid, in the same manner.

The mercury may be introduced into the casing in a manner similar to that described in previous modifications and appropriate sealing means designated by numerals 210 and 211 may be provided to prevent leakage of mercury between sleeves 184 and 192 and the sides of the casing.

What I claim is:

1. A governor comprising a rotatable casing containing a liquid and having an opening axially therein, an actuating mechanism arranged in said casing and having a portion extending into said opening, a block having one end pivotally mounted adjacent the inner periphery of said casing and the free end of which is movable inwardly by the centrifugally-developed buoyant force of said liquid during the rotation of said casing, and means associated with said block and said actuating mechanism for moving the actuating mechanism axially with a snap action when the free end of the block is moved inwardly.

2. A governor comprising a rotatable casing containing a liquid and having a conically inclined central portion arranged interiorly of the casing, said casing being provided with an axial opening, an actuating mechanism having a portion arranged in said opening and an enlarged portion arranged adjacent the inclined surface, and a plurality of segmental blocks interposed between the conically inclined portion and the inner periphery of said casing, the face of each of which has an inclined surface mating with the inclined surface of the central portion, said blocks being adapted to be forced inwardly and downwardly along the central portion into engagement with the enlarged portion of said actuating mechanism by the centrifugally-developed buoyant force of said liquid during the rotation of said casing.

3. A governor comprising a rotatable casing containing a liquid and having an inclined member arranged interiorly of the casing, a block interposed between the inclined member and the inner periphery of the casing, the inner face of which has an inclined surface having the same degree of inclination as the inclined member in the casing, said block being movable inwardly and downwardly by the centrifugally-developed buoyant force of said liquid during the rotation of the casing, and an actuating member which is movable in response to the inward and downward movement of said block.

4. A governor comprising a rotatable casing containing a liquid and having an inclined portion arranged interiorly of the casing, said casing being provided with an axial opening, an actuating mechanism arranged in said casing with a portion extending into said opening, a plurality of segmental blocks interposed between the inclined portion and the inner periphery of the casing, the inner face of each of which has an inclined surface having the same degree of inclination as the surface of the inclined portion, resilient means for maintaining said blocks at one end of said casing with their outer periphery adjacent the inner periphery of the casing, and said blocks being movable radially inwardly and downwardly into engagement with said actuating mechanism by the centrifugally-developed buoyant force of said liquid during the rotation of said casing.

5. A governor comprising a rotatable casing containing a liquid, a member having an inclined surface arranged interiorly of the casing, a plurality of segmental blocks interposed between said member and the inner periphery of the casing, the inner face of each of which has an inclined surface having the same degree of inclination as the member in the casing, means for rotating the segmental blocks with the casing, said blocks being movable radially inwardly and downwardly by the centrifugally-developed buoyant force of the liquid during the rotation of said casing, and an actuating mechanism which is movable in response to the inward and downward movement of said blocks.

6. A governor comprising a rotatable casing containing a liquid, a block having one end pivotally mounted adjacent the inner periphery of the casing and the free end of which is movable radially inwardly by the centrifugally-developed buoyant force of the liquid during the rotation of said casing, and actuating means movable in response to the inward movement of the free end of said block.

7. A governor comprising a rotatable casing, a plurality of segmental blocks, each having one end pivotally mounted adjacent the inner periphery of said casing and the free end of each of which is movable radially inwardly by the centrifugally-developed buoyant force of the liquid during the rotation of said casing, and actuating means movable in response to the inward movement of said blocks.

8. A governor comprising a rotatable casing provided with an axial opening, said casing containing a liquid which is free to form an annulus around the inner periphery of the casing during rotation of the casing, actuating means including an actuating pin slidably mounted in said opening and a shifter cone arranged interiorly of said casing, a plurality of segmental blocks arranged in said casing between its inner periphery and said shifter cone, each of which has an inclined surface for engaging said shifter cone and each being movable radially inwardly by the centrifugally-developed buoyant force of said liquid during rotation of said casing to force said pin axially outwardly through said opening during rotation of said casing, and said blocks and shifter cone being so disposed with respect to each other that substantially all of the inward force of said liquid upon said blocks is directed in moving said shifter cone toward said opening to force said pin outwardly through said opening.

9. A governor comprising a rotatable casing containing a liquid, said casing having oppositely disposed ends, one of which is provided with an axial opening and a central portion arranged between the two ends having an inner periphery, displaceable means having oppositely disposed ends arranged in said casing, means for maintaining said displaceable means in engagement with the periphery of the casing when the casing is at rest or is rotated at low speed, at least a portion of said displaceable means being spaced at a sufficient distance from one end of said casing to permit liquid to pass between the inner periphery of the casing and the displaceable means and form an annulus of liquid partially submerging said displaceable means and engaging the inner periphery of said casing during the rotation of said casing above a predetermined speed, an actuating mechanism having an inner portion arranged in said casing and a portion movable outwardly through said opening, resilient means for maintaining said actuating mechanism in its innermost position when said casing is at rest or is rotated at low speed, at least a portion of said displaceable means being movable inwardly by the centrifugally-developed buoyant force of said liquid when said casing is rotated above a predetermined speed, and said displaceable means and the inner portion of said actuating mechanism being so arranged relative to each other that substantially all the inward force of the liquid on said displaceable means is directed in moving said actuating mechanism to cause a portion of said actuating mechanism to be forced outwardly through said opening against the force of said resilient means, and said resilient means being movable to its original position when the rotation of said casing falls below its predetermined speed and being effective during such movement in returning said actuating mechanism to its original position.

10. A governor comprising a rotatable casing containing a liquid, said casing having oppositely disposed ends, one of which is provided with an axial opening and a central portion arranged between the two ends having an inner periphery, a plurality of spaced segmental blocks arranged in said casing, means for maintaining said blocks in engagement with the periphery of said casing when the casing is at rest or is rotated at low speed, at least a portion of each of said blocks being spaced at sufficient distance from one end of said casing to permit liquid to pass between the inner periphery of the casing and said blocks and form an annulus of liquid partially submerging said blocks and engaging the inner periphery of the central portion of the casing during the rotation of said casing above a predetermined speed and said blocks being spaced sufficiently from each other to permit inward displacement of at least a portion of each of said blocks, actuating mechanism having an inner portion arranged in said casing and a portion movable outwardly through said opening, resilient means for normally maintaining said actuating mechanism in its innermost position when said casing is at rest or is rotated at low speed, at least a portion of each of said blocks being movable inwardly by the centrifugally-developed buoyant force of said liquid when said casing is rotated above the predetermined speed and said blocks and the inner portion of said actuating mechanism being so arranged relative to each other that substantially all the inward force of the liquid on said blocks is directed in moving said actuating mechanism in an axial direction against the force of said resilient means to cause a portion of said actuating mechanism to be forced outwardly through said opening, and said resilient means being movable to its original position when the rotation of said casing falls below its predetermined speed and being effective during such movement in returning said actuating means to its original position.

11. A governor comprising a rotatable casing containing a liquid and having oppositely disposed ends, one of which is provided with an axial opening, and a central portion arranged between the ends having an inner periphery, displaceable means having oppositely disposed ends arranged in said casing, means for maintaining said displaceable means in engagement with the inner periphery of the casing when the casing is at rest or is rotating at low speed and at least a portion of said displaceable means being spaced at a sufficient distance from one end of said casing to permit liquid to pass between the inner periphery of the casing and said displaceable means and form an annulus of liquid engaging the inner periphery of the central portion of said casing and partially submerging said displaceable means during the rotation of said casing above a predetermined speed, actuating mechanism including a pin movable outwardly through said opening and an inner enlarged portion provided with an inner face arranged in said casing with the inner face engaging said displaceable means, resilient means arranged outside of said casing and engaging said pin for maintaining the actuating mechanism in its innermost position with the inner face of said actuating mechanism engaging said displaceable means when said casing is at rest or is rotated at low speeds, at least a portion of said displaceable means being movable inwardly by the centrifugally-developed buoyant force of said liquid during the rotation of said casing above a predetermined speed and said displaceable means having a portion shaped to engage the inner face of the enlarged portion of said actuating mechanism which is so arranged relative to said face that substantially all the force of said displaceable means upon the inner face of said actuating mechanism during its inward movement is directed in moving the actuating mechanism in an axial direction to cause a portion of said actuating mechanism to be forced outwardly through said opening against the force of said resilient means, and at least a portion of said resilient means being so biased against said pin that it becomes effective in initiating the return movement of said actuating mechanism to its original position when the casing falls below the predetermined speed.

12. A governor comprising a cylindrical rotatable casing containing a liquid, said casing having oppositely disposed ends, one of which is provided with an axial opening and a central portion arranged between the two ends having an inner periphery, a plurality of spaced segmental blocks arranged in said casing, means for maintaining said blocks in engagement with the inner periphery of said casing when said casing is at rest or is rotated at low speed and a portion of each of said segmental blocks being spaced at a sufficient distance from one end of said casing to permit liquid to pass between the inner periphery of said casing and said blocks to form an annulus of liquid engaging the inner periphery of the central portion of said casing and partially submerging said blocks during the rotation of said casing above a predetermined speed and said blocks being sufficiently spaced from each other to permit inward displacement of at least a portion of each of said blocks, actuating mechanism having a pin movable outwardly through said opening and an inner enlarged portion arranged in said casing and having an inner face, resilient means arranged outside of said casing and engaging said pin for normally maintaining said actuating mechanism in its innermost position with the inner face of said actuating mechanism engaging said blocks when said casing is at rest or is rotated at low speed, at least a portion of each of said blocks being movable inwardly by the centrifugally-developed buoyant force of said liquid to move said actuating mechanism when said casing is rotated above a predetermined speed, and said blocks having portions shaped to engage the inner face of the inner portion of said actuating mechanism so that substantially all the inward force of said blocks on the inner portion of said actuating mechanism is directed in moving said actuating mechanism in an axial direction to force a portion of said actuating mechanism outwardly against the force of said resilient means when said casing is rotated above a predetermined speed, and at least a portion of said resilient means being so biased against a portion of said actuating mechanism that it becomes effective in initiating the return of said actuating mechanism to its original position when the rotation of said casing falls below the predetermined speed.

13. A governor comprising a cylindrical casing containing a liquid and having oppositely disposed ends, means for rotating said casing including a shaft affixed in cantilever fashion to one end of said casing and said casing being provided with an opening at its opposite end in alignment with the fixed end of said shaft, a plurality of spaced segmental blocks arranged in said casing, means for maintaining said blocks in engagement with the inner periphery of said casing when the casing is at rest or is rotated at low speed, at least one end of each of said blocks being spaced at a sufficient distance from one end of said casing to permit liquid to pass between the inner periphery of said casing and said blocks to form an annulus of liquid engaging the inner periphery of the central portion of said casing and partially submerging said blocks during the rotation of said casing above a predetermined speed and said blocks being spaced at a sufficient distance from each other to permit inward displacement of at least a portion of each of said blocks, an actuating mechanism having a portion movable outwardly through said opening and an inner enlarged portion arranged in said casing having an inner face, resilient means for normally maintaining said actuating mechanism in its innermost position when said casing is at rest or is rotated at low speed, at least a portion of each of said blocks being movable inwardly by the centrifugally-developed buoyant force of said liquid to move said actuating mechanism when said casing is rotated above a predetermined speed and said blocks having portions engaging the inner face of the inner portion of said actuating mechanism so that substantially all the force of said blocks against the inner face of said actuating mechanism is directed in moving the actuating mechanism to force a portion of said actuating mechanism outwardly through said opening against the force of said resilient means and at least a portion of said resilient means being so biased against a portion of said actuating mechanism that it is effective in initiating the return of said actuating mechanism to its original position when the rotation of said casing falls below the predetermined speed.

14. The combination of a governor and a snap acting device, said governor comprising a rotatable casing containing a liquid and having oppositely disposed ends and a central portion arranged between the two ends having an inner periphery and one of said ends being provided with an axial opening, displaceable means arranged in said casing, means for normally maintaining said displaceable means in engagement with the periphery of said casing, actuating mechanism arranged in said casing including a pin extending through said opening, means for supporting said snap acting device in proximity to that end of the casing which is provided with the axial opening, and said snap acting device including a flexible actuating lever, an arm to be actuated, and a spring arranged between and engaging said lever and arm, and said arm being movable by said lever to a position to actuate said device, said lever being biased away from said arm into engagement with said pin and being normally maintained in engagement therewith by its own force and the force of said spring, and the force of said biased lever and the force of said spring being sufficient to maintain the actuating mechanism of said governor in its innermost position when said casing is at rest or is being rotated at low speed, at least a portion of said displaceable means being movable inwardly by the centrifugally-developed buoyant force of said liquid and said displaceable means and the inner portion of said actuating means being so arranged relative to each other that substantially all the inward force of the liquid on said displaceable means is directed in moving said actuating means to force said pin outwardly a sufficient distance against the force of said lever and the force of said spring to change the position of said lever and said spring to a sufficient extent to actuate said snap acting device, and the lever of said snap acting device being biased to a sufficient extent to initiate the return of said actuating mechanism and said spring to their original positions when the casing is rotated below the predetermined speed.

15. The combination of a governor and a snap acting device, said governor comprising a rotatable cylindrical casing containing a liquid and having oppositely disposed ends, one of which is provided with an axial opening, a plurality of spaced segmental blocks arranged in said casing, means for maintaining said blocks in engagement with the inner periphery of the casing when the casing is at rest or is rotating at low speed, actuating mechanism including a pin extending through said opening and an enlarged inner portion arranged in said casing having an inner face engaging said blocks, means for supporting said snap acting device in proximity to the end of the casing provided with the axial opening and said snap acting device including a resilient lever, an arm to be actuated, and a spring arranged between and engaging said lever and said arm and being movable by said lever to a position to actuate said device, said lever being biased away from said arm into engagement with said pin and being normally maintained in engagement therewith by its own force and by the force of said spring, and the force of said biased lever and the force of said spring being sufficient to maintain the actuating mechanism of said governor in its innermost position when the casing is at rest or is being rotated at low speed, at least a portion of each of said blocks being movable inwardly by the centrifugally-developed buoyant force of said liquid and said blocks having portions shaped to engage the inner face of said actuating mechanism and force said actuating pin outwardly a sufficient distance against the force of said lever and the force of said spring to move said lever a sufficient distance to actuate said snap acting device when said casing is rotated above a predetermined speed and said lever being biased to a sufficient extent to initiate the return movement of said actuating mechanism and said spring to their original positions when the rotation of the casing falls below the predetermined speed.

16. In combination, a housing having an opening at one end, a rotatable casing arranged in said housing having a shaft affixed to one end thereof for rotating said casing which shaft extends through the opening in said housing, said casing containing a liquid and being provided with an axial opening arranged in the end of the casing opposite to said shaft, a plurality of segmental blocks arranged in said casing, and means for normally maintaining said blocks in engagement with the inner periphery of said casing, actuating mechanism having a pin which extends through and is slidable in the opening in said casing and an enlarged inner portion having an inner face, a cover affixed to the other end of said housing and having a snap acting device arranged on its inner face including a flexible lever, an arm to be actuated, and a spring arranged between and engaging said lever and said arm and being movable by said lever to actuate said device, said lever being biased away from said arm into engagement with said pin and being normally maintained in engagement therewith by its force and the force of said spring, and the force of said lever and the force of said spring being sufficient to maintain said actuating mechanism in its innermost position in the casing when the casing is at rest or is being rotated at low speed, at least a portion of each of said blocks being movable inwardly by the centrifugally-developed buoyant force of said liquid to move said pin outwardly a sufficient distance against the force of said lever and the force of said spring to change the position of said spring to a sufficient extent to actuate said snap acting device, and said lever being biased to a sufficient extent to initiate the return of said actuating mechanism and said spring to their original positions when the casing comes to rest.

17. In combination, a housing having an opening at one end, a governor, said governor having a rotatable casing arranged in said housing and a shaft affixed to one end thereof for rotating said casing which shaft extends through the opening in said housing, said casing containing a liquid and being provided with an axial opening arranged in the end of the casing opposite to said shaft, a plurality of segmental blocks arranged in said casing and means for normally maintaining said blocks in engagement with the inner periphery of said casing, actuating mechanism having a pin which extends through and is slidable in the opening in said casing and an enlarged inner portion having an inner face, a cover affixed to the other end of said housing and having a snap acting device arranged on its inner face including a flexible lever, an arm to be actuated, and a spring arranged between and engaging said lever and said arm, and being movable by said lever to actuate said device, said lever being biased away from said arm into engagement with said pin and being normally maintained in engagement therewith by its force and the force of said spring, and the force of said lever and the force of said spring being sufficient to maintain said actuating mechanism in its innermost position in the casing when the casing is at rest or is being rotated at low speed, at least a portion of each of said blocks being movable inwardly by the centrifugally-developed buoyant force of said liquid to move said pin outwardly a sufficient distance against the force of said lever and the force of said spring to change the position of said spring to an extent sufficient to actuate said snap acting device, said lever being biased to an extent sufficient to initiate the return of said actuating mechanism and said spring to their original positions when the rotative speed of the casing falls below the predetermined speed, and means accessible from outside of said housing for varying the bias of said lever.

EVERARD F. KOHL.

REFERENCES CITED

The following references are of record in the file of this patent:

UNITED STATES PATENTS

| Number | Name | Date |
|---|---|---|
| 849,884 | Brown | Apr. 9, 1907 |
| 931,707 | Warren | Aug. 17, 1909 |
| 1,031,893 | Volk | July 9, 1912 |
| 1,325,016 | Harley | Dec. 16, 1919 |
| 1,441,353 | Johnson | Jan. 9, 1923 |
| 1,502,594 | Spiva | July 22, 1924 |
| 1,530,740 | Smoot | Mar. 24, 1925 |
| 1,618,644 | Dickson | Feb. 22, 1927 |
| 1,723,144 | Farmer | Aug. 6, 1929 |
| 1,791,028 | Huff | Feb. 3, 1931 |
| 1,809,152 | Thiemann | June 9, 1931 |
| 1,811,850 | Huff | June 30, 1931 |
| 1,848,615 | Föttinger | Mar. 8, 1932 |
| 2,083,343 | Naul | June 8, 1937 |
| 2,141,772 | Stadler | Dec. 27, 1938 |
| 2,160,553 | Martinotti | May 30, 1939 |
| 2,237,705 | Kohl | Apr. 8, 1941 |
| 2,247,989 | Cita | July 1, 1941 |
| 2,258,157 | Kohl | Oct. 7, 1941 |
| 2,283,267 | Kohl | May 19, 1942 |
| 2,307,797 | Kohl | Jan. 12, 1943 |
| 2,410,663 | Kohl | Nov. 5, 1946 |

FOREIGN PATENTS

| Number | Country | Date |
|---|---|---|
| 286,850 | Germany | Sept. 4, 1915 |